US012670793B2

(12) United States Patent
Fukazawa

(10) Patent No.: US 12,670,793 B2
(45) Date of Patent: Jun. 30, 2026

(54) ALARM DEVICE AND ALARM METHOD

(71) Applicant: TOYOTA JIDOSHA KABUSHIKI KAISHA, Toyota (JP)

(72) Inventor: Kazuki Fukazawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 23 days.

(21) Appl. No.: 18/908,814

(22) Filed: Oct. 8, 2024

(65) Prior Publication Data

US 2025/0157334 A1 May 15, 2025

(30) Foreign Application Priority Data

Nov. 15, 2023 (JP) ................................ 2023-194355

(51) Int. Cl.
*G08G 1/16* (2006.01)
*G08G 1/0967* (2006.01)

(52) U.S. Cl.
CPC ............. *G08G 1/16* (2013.01); *G08G 1/0967* (2013.01)

(58) Field of Classification Search
CPC ........ G08G 1/16; G08G 1/0967; G08G 1/168; G08G 1/165; G08G 1/166; G08G 1/09623; G08B 3/10; G08B 21/182; G01S 13/867; G06V 20/58; B60Q 5/005; B60Q 5/006
See application file for complete search history.

(56) References Cited

U.S. PATENT DOCUMENTS

| | | | | |
|---|---|---|---|---|
| 5,450,057 | A * | 9/1995 | Watanabe .............. | B60Q 9/007 381/86 |
| 9,896,031 | B1 * | 2/2018 | Groh ...................... | B60Q 9/008 |
| 9,969,261 | B2 | 5/2018 | Kodama | |
| 10,045,173 | B1 | 8/2018 | Morimura et al. | |
| 10,106,157 | B2 | 10/2018 | Sawada et al. | |
| 10,150,407 | B2 | 12/2018 | Takahashi et al. | |
| 10,696,297 | B2 | 6/2020 | Nguyen Van et al. | |
| 11,001,255 | B2 | 5/2021 | Fukuman et al. | |
| 11,110,937 | B2 | 9/2021 | Kinoshita et al. | |
| 2004/0260433 | A1 * | 12/2004 | Sawada ................. | B60Q 9/006 701/1 |

(Continued)

FOREIGN PATENT DOCUMENTS

| | | | |
|---|---|---|---|
| JP | 2007-048102 A | | 2/2007 |
| JP | 2009151649 A | * | 7/2009 |

*Primary Examiner* — Adnan Aziz
(74) *Attorney, Agent, or Firm* — SoraIP, Inc.

(57) ABSTRACT

An alarm device executes first alarm processing when an alarm target satisfies a first alarm condition, and second alarm processing when the alarm target satisfies a second alarm condition. In a first alarm state where the first or second alarm processing is executed upon detection of the alarm target, when a second object is detected as an alarm target different from a first object that is an alarm target of the first alarm state, the alarm device does not execute the first alarm processing for the second object as the alarm target even when the second object satisfies the first alarm condition, determines priorities of the second alarm processing for the first object and the second object when the second object satisfies the second alarm condition, and executes the second alarm processing for the second object when the priority of the second alarm processing for the second object is higher.

8 Claims, 5 Drawing Sheets

(56) References Cited

U.S. PATENT DOCUMENTS

| | | | | |
|---|---|---|---|---|
| 2010/0060441 | A1* | 3/2010 | Iwamoto | B60W 50/14 340/435 |
| 2015/0015714 | A1* | 1/2015 | Gokan | B60R 11/04 348/148 |
| 2015/0110285 | A1* | 4/2015 | Censo | B60Q 5/006 381/86 |
| 2015/0365743 | A1* | 12/2015 | Konigsberg | H04R 3/00 381/86 |
| 2017/0084177 | A1* | 3/2017 | Matsuoka | G08G 1/163 |
| 2017/0294124 | A1* | 10/2017 | Baba | G06V 20/58 |
| 2018/0033306 | A1* | 2/2018 | Kim | G06V 40/103 |
| 2018/0215333 | A1* | 8/2018 | Rosenbaum | B60R 21/013 |
| 2019/0001968 | A1 | 1/2019 | Yorifuji et al. | |
| 2019/0259284 | A1* | 8/2019 | Khadloya | G06V 10/25 |
| 2019/0344828 | A1 | 11/2019 | Omori et al. | |
| 2019/0389488 | A1 | 12/2019 | Yamada et al. | |
| 2020/0100028 | A1* | 3/2020 | Hashimoto | H04R 1/025 |

* cited by examiner

ALARM DEVICE AND ALARM METHOD

CROSS-REFERENCE TO RELATED APPLICATION

This application claims priority to Japanese Patent Application No. 2023-194355 filed on Nov. 15, 2023, incorporated herein by reference in its entirety.

BACKGROUND

1. Technical Field

The present disclosure relates to an alarm device and an alarm method, and more particularly, to a technique for giving, to a driver of a host vehicle, an alarm about a peripheral object or an approaching object.

2. Description of Related Art

For example, Japanese Unexamined Patent Application Publication No. 2007-048102 (JP 2007-048102 A) discloses a device that, upon detection of multiple approaching objects that are approaching a host vehicle, varies characteristics (pulses, tone colors, frequencies, and the like) of sounds to be emitted from multiple sound sources in accordance with degrees of danger of the approaching objects, thereby giving a driver an alarm about the existence of the multiple approaching objects.

SUMMARY

With the device disclosed in JP 2007-048102 A, the alarm about the multiple approaching objects can be given to the driver. However, in a state where a warning sound requesting, for example, a brake operation is emitted, when a different warning sound is emitted, the driver may be confused. Therefore, even in a case where there are warning targets that differ from each other, when the content of an alarm (for example, a brake operation request) to be given to the driver is the same, emitting the same warning sound may prevent the driver from being confused. On the other hand, in a state where the driver keeps driving the vehicle without stopping the vehicle even after recognizing a warning target of a warning sound, when a new peripheral object or approaching object having a high risk level appears, it is desired to reliably give the driver an alarm about a new risk.

The present disclosure is made to reliably give a driver an alarm about the existence of a peripheral object or an approaching object having a high risk level while effectively preventing confusion of the driver that would otherwise be caused by emission of multiple alarm sounds.

An aspect of the present disclosure relates to an alarm device. The alarm device is configured to: detect a peripheral object existing in a periphery of a host vehicle or an approaching object approaching the host vehicle as an alarm target; execute first alarm processing for an occupant of the host vehicle in a case where the alarm target satisfies a first alarm condition as an alarm condition of a predetermined first risk level; and execute second alarm processing for the occupant in a case where the alarm target satisfies a second alarm condition as an alarm condition of a predetermined second risk level higher than the first risk level. The first alarm processing and the second alarm processing have a common first characteristic of an alarm sound and differ in a second characteristic that is different from the first characteristic. From a non-alarm state where neither the first alarm processing nor the second alarm processing is executed, transition is made into a first alarm state where one of the first alarm processing and the second alarm processing is executed in response to detection of the alarm target. In the first alarm state, in a case where the alarm device detects a second object as an alarm target different from a first object that is the alarm target of the first alarm state, the alarm device does not execute the first alarm processing for the second object as the alarm target even when the second object satisfies the first alarm condition, the alarm device determines priorities of the second alarm processing for the first object and the second alarm processing for the second object based on directions of the first object and the second object with respect to the host vehicle and risk levels of the first object and the second object when the second object satisfies the second alarm condition, and the alarm device executes the second alarm processing for the second object when determining that the priority of the second alarm processing for the second object is higher than the priority of the second alarm processing for the first object. The alarm sound of the second alarm processing for the second object has the same second characteristic as the alarm sound of the second alarm processing for the first object, and the alarm sound of the second alarm processing for the first object and the alarm sound of the second alarm processing for the second object differ from each other in a third characteristic that is different from the second characteristic.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, a control device for a vehicle and a control method for a vehicle according to a present embodiment will be described with reference to the accompanying drawings.

Hardware Configuration

Figure 1:
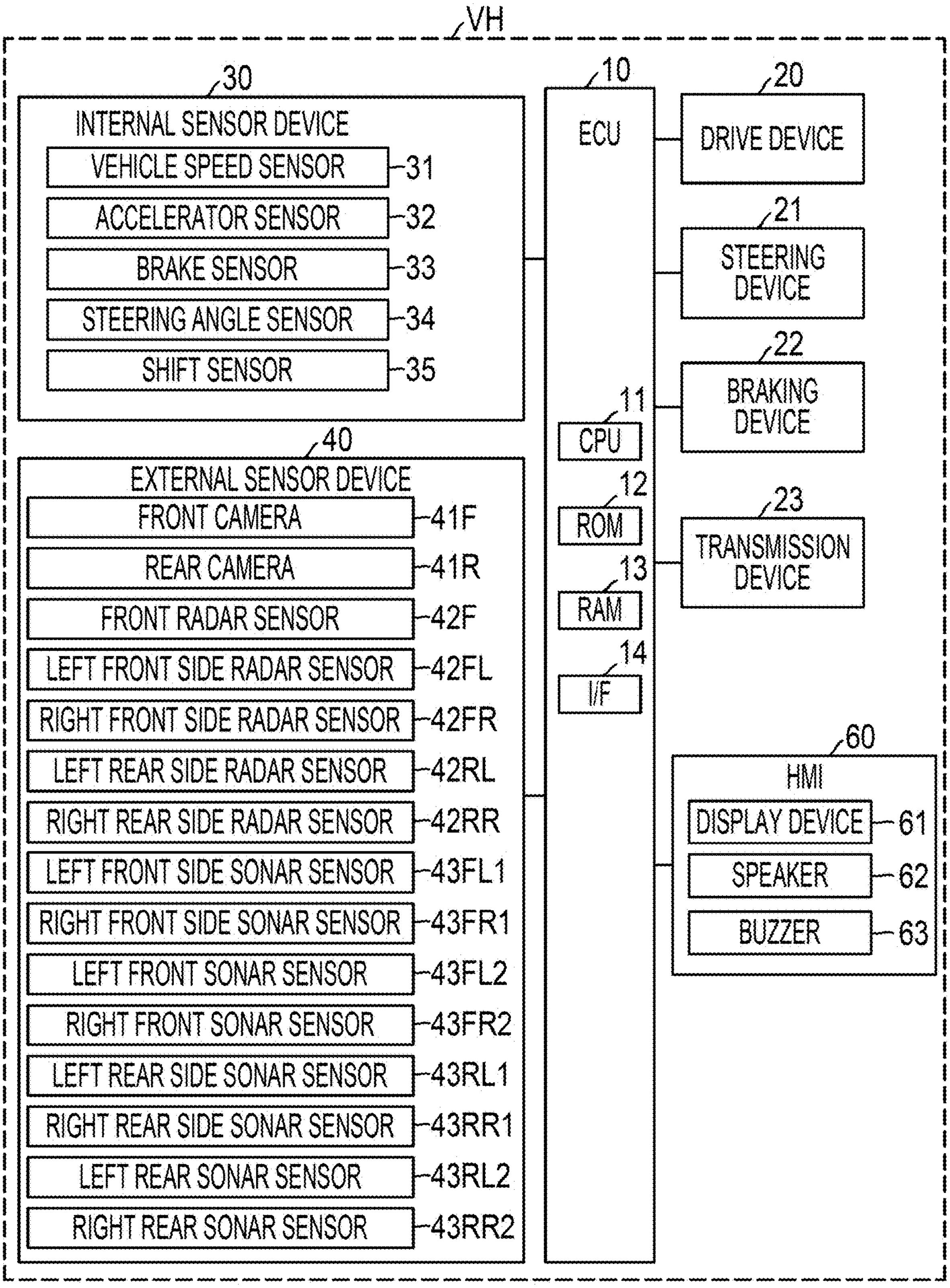
FIG. 1 is a schematic diagram illustrating a hardware configuration of a vehicle to which a control device according to a present embodiment is applied.

FIG. 1 is a schematic diagram illustrating a hardware configuration of a vehicle VH to which the control device according to the present embodiment is applied. Hereinafter, in a case where the vehicle VH needs to be distinguished from another vehicle or the like, the vehicle VH may be referred to as a host vehicle.

The vehicle VH includes an electronic control unit (ECU) 10. The ECU 10 includes a central processing unit (CPU) 11, a read only memory (ROM) 12, a random access memory (RAM) 13, an interface device 14, and the like. The CPU 11 is a processor that executes various programs stored in the ROM 12. The ROM 12 is a non-volatile memory and stores data or the like needed for the CPU 11 to execute the various programs. The RAM 13 is a volatile memory that provides a work area where the various programs are executed by the CPU 11. The interface device 14 is a communication device that communicates with an external device.

The ECU 10 is a central device that executes driving assistance control and the like. The driving assistance control is a concept including autonomous driving control. A drive device 20, a steering device 21, a braking device 22, a transmission device 23, an internal sensor device 30, an external sensor device 40, a human machine interface (HMI) 60, and the like are communicably connected to the ECU 10.

The drive device 20 generates a drive force to be transmitted to drive wheels of the vehicle VH. Examples of the drive device 20 include an electric motor and an engine. In the present embodiment, the vehicle VH may be any one of a hybrid electric vehicle (HEV), a plug-in hybrid electric vehicle (PHEV), a fuel cell electric vehicle (FCEV), a battery electric vehicle (BEV), and an engine vehicle. The steering device 21 applies a steering force to wheels of the vehicle VH. The braking device 22 applies a braking force to the wheels of the vehicle VH. The transmission device 23 changes a speed of rotation output from the drive device 20 at a predetermined gear ratio and transmits the rotation having a changed speed to the drive wheels.

The internal sensor device 30 is a group of sensors that detect a state of the vehicle VH. Specifically, the internal sensor device 30 includes a vehicle speed sensor 31, an accelerator sensor 32, a brake sensor 33, a steering angle sensor 34, a shift sensor 35, and the like. The internal sensor device 30 transmits the state of the vehicle VH detected by each of the sensors 31, 32, 33, 34, 35 to the ECU 10 at a predetermined cycle.

The vehicle speed sensor 31 detects a traveling speed (hereinafter, a vehicle speed) of the vehicle VH. The accelerator sensor 32 detects an operation amount of an accelerator pedal (not illustrated) by a driver. The brake sensor 33 detects an operation amount of a brake pedal (not illustrated) by the driver. The steering angle sensor 34 detects a rotation angle of a steering wheel (not illustrated) or a steering shaft (not illustrated) of the vehicle VH, that is, a steering angle. The shift sensor 35 detects a shift position (parking P, reverse R, neutral N, drive D, or the like) of the transmission device 23.

The external sensor device 40 is a group of sensors that recognize object information regarding an object existing in the periphery of the vehicle VH. Specifically, the external sensor device 40 includes a front camera 41F, a rear camera 41R, a front radar sensor 42F, a left front side radar sensor 42FL, a right front side radar sensor 42FR, a left rear side radar sensor 42RL, a right rear side radar sensor 42RR, a left front side sonar sensor 43FL1, a right front side sonar sensor 43FR1, a left front sonar sensor 43FL2, a right front sonar sensor 43FR2, a left rear side sonar sensor 43RL 1, a right rear side sonar sensor 43RR1, a left rear sonar sensor 43RL2, a right rear sonar sensor 43RR2, and the like. Here, examples of the object information include a moving object, such as another vehicle or a pedestrian, and a stationary object, such as a wall or a pole. The external sensor device 40 repeatedly transmits the acquired object information to the ECU 10 every time a predetermined time elapses.

Hereinafter, in a case where the distinction is not needed, the cameras 41F, 41R are simply referred to as "camera 41". In a case where the distinction is not needed, the radar sensors 42F, 42FL, 42FR, 42RL, 42RR are simply referred to as "radar sensor 42". In a case where the distinction is not needed, the sonar sensors 43FL1, 43FR1, 43FL2, 43FR2, 43RL1, 43RR1, 43RL2, 43RR2 are simply referred to as "sonar sensor 43".

The camera 41 is, for example, a stereo camera or a monocular camera, and a digital camera having an imaging device, such as a CMOS or a CCD, can be used. The camera 41 captures an image of the periphery of the vehicle VH and acquires the object information in the periphery of the vehicle VH by processing the captured image data. The object information is information indicating a type of an object detected in the periphery of the vehicle VH, a relative distance between the vehicle VH and the object, a relative speed 30 between the vehicle VH and the object, and the like. The type of the object may be recognized by machine learning, such as pattern matching.

The radar sensor 42 detects an object existing in the periphery of the vehicle VH. The radar sensor 42 includes a millimeter wave radar and/or a LiDAR. The millimeter wave radar emits radio waves (millimeter waves) in a millimeter wave band and receives millimeter waves (reflected waves) reflected by an object existing in an emission range. The millimeter wave radar acquires a relative distance between the vehicle VH and the object, a relative speed between the vehicle VH and the object, and the like based on a phase difference between the transmitted millimeter waves and the received reflected waves, an attenuation level of the reflected waves, a time from the transmission of the millimeter waves to the reception of the reflected waves, and the like. The LiDAR sequentially emits pulsed laser beams having a shorter wavelength than the millimeter waves in multiple directions, and receives the reflected light reflected by the object, to acquire a shape of the object detected in the periphery of the vehicle VH, a relative distance between the vehicle VH and the object, a relative speed between the vehicle VH and the object, and the like.

The sonar sensor 43 is a well-known sensor that uses ultrasound. The sonar sensor 43 emits ultrasound to a predetermined range in the periphery of the vehicle VH. The sonar sensor 43 receives reflected waves reflected by an object existing in the emission range of the ultrasound, and detects whether an object exists, a distance between the vehicle VH and the object, and the like based on a time from the transmission to the reception of the ultrasound. The sonar sensor 43 can detect an object located substantially in front by emitting highly directional ultrasound.

Figure 2A:
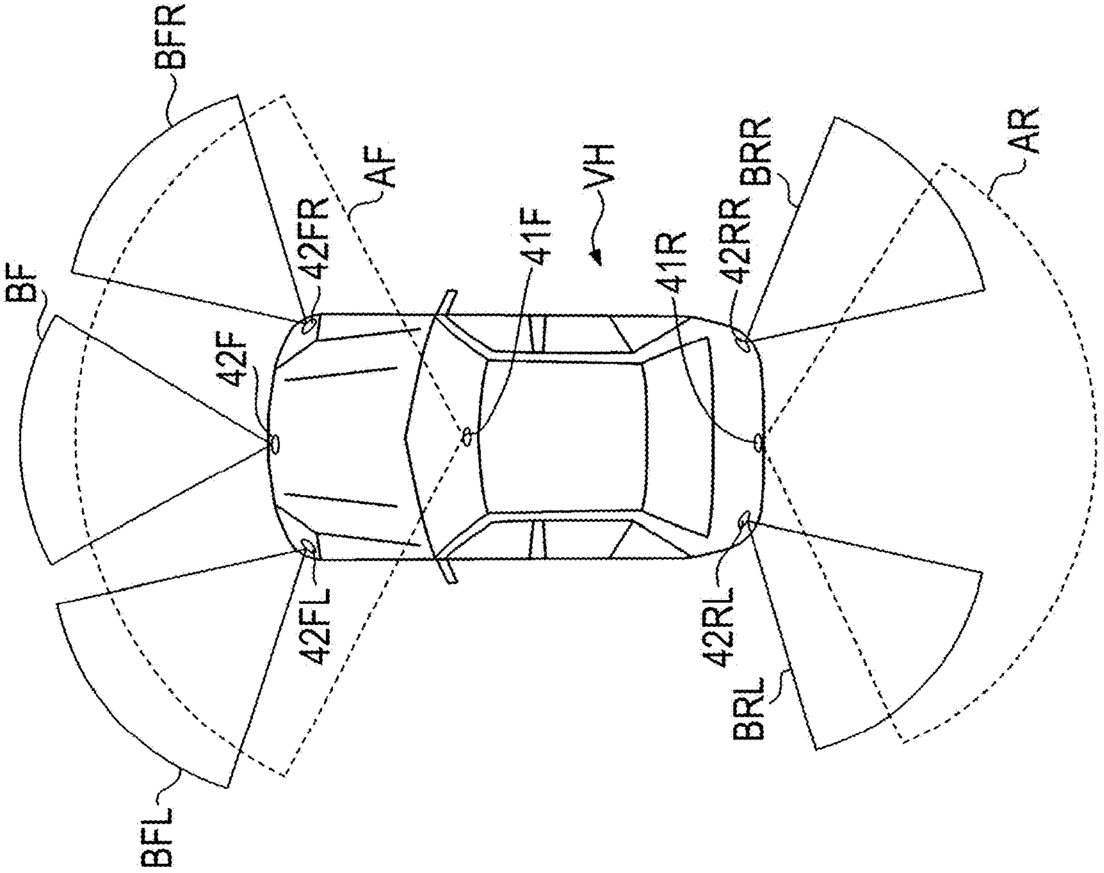
FIG. 2A is a schematic diagram illustrating an example of an in-vehicle position of each sensor of an external sensor device according to the present embodiment.

FIG. 2A is a schematic diagram illustrating an example of in-vehicle positions of the front camera 41F, the rear camera 41R, the front radar sensor 42F, the left front side radar sensor 42FL, the right front side radar sensor 42FR, the left rear side radar sensor 42RL, and the right rear side radar sensor 42RR.

As illustrated in FIG. 2A, the front camera 41F is provided, for example, at the center of an upper portion of a windshield of the vehicle VH in a vehicle width direction. An imaging area AF of the front camera 41F is a wide-angle area that extends from a substantially central portion of the windshield in the vehicle width direction toward the front of the vehicle VH. The rear camera 41R is provided, for example, at a substantially central portion of a rear bumper of the vehicle VH in the vehicle width direction. An imaging area AR of the rear camera 41R is a wide-angle area that extends from the substantially central portion of the rear bumper in the vehicle width direction toward the rear of the vehicle VH.

The front radar sensor 42F is provided, for example, in a substantially central portion of a front bumper in the vehicle width direction. A detection area BF of the front radar sensor 42F is a wide-angle area that extends from the substantially central portion of the front bumper in the vehicle width direction toward the front of the vehicle VH. The left front side radar sensor 42FL is provided at a left end portion of the front bumper, and the right front side radar sensor 42FR is provided at a right end portion of the front bumper. A detection area BFL of the left front side radar sensor 42FL is a wide-angle area that extends from the left end portion of the front bumper toward a left front side. A detection area BFR of the right front side radar sensor 42FR is a wide-angle area that extends from the right end portion of the front bumper toward a right front side. The left rear side radar sensor 42RL is provided at a left end portion of the rear bumper, and the right rear side radar sensor 42RR is provided at a right end portion of the rear bumper. A detection area BRL of the left rear side radar sensor 42RL is a wide-angle area that extends from the left end portion of the rear bumper toward a left rear side. A detection area BRR of the right rear side radar sensor 42RR is a wide-angle area that extends from the right end portion of the rear bumper toward a right rear side.

Figure 2B:
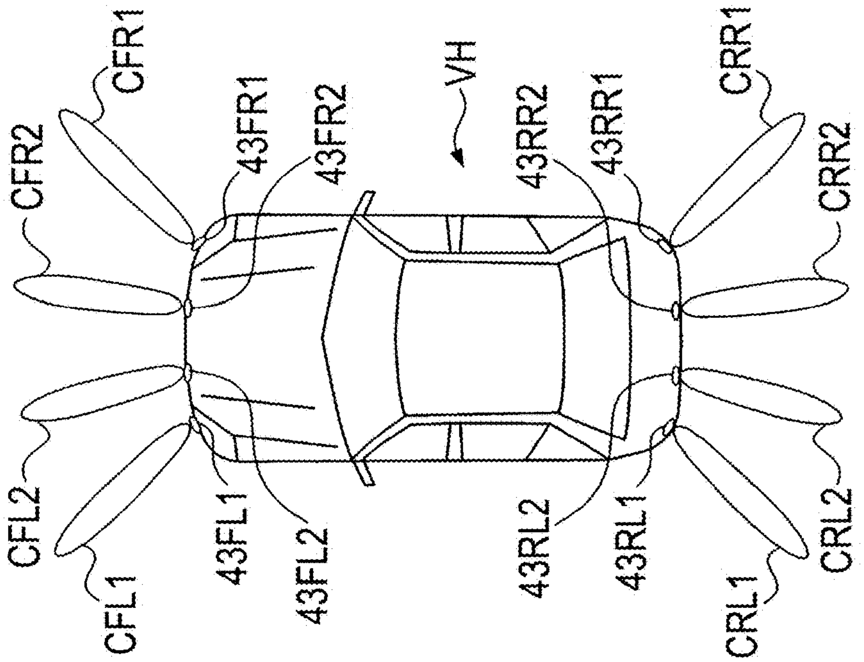
FIG. 2B is a schematic diagram illustrating an example of an in-vehicle position of each sensor of the external sensor device according to the present embodiment.

FIG. 2B is a schematic diagram illustrating an example of in-vehicle positions of the left front side sonar sensor 43FL1, the right front side sonar sensor 43FR1, the left front sonar sensor 43FL2, the right front sonar sensor 43FR2, the left rear side sonar sensor 43RL1, the right rear side sonar sensor 43RR1, the left rear sonar sensor 43RL2, and the right rear sonar sensor 43RR2.

As illustrated in FIG. 2B, the left front side sonar sensor 43FL1 is provided at the left end portion of the front bumper, and the right front side sonar sensor 43FR1 is provided at the right end portion of the front bumper. A detection area CFL1 of the left front side sonar sensor 43FL1 is a relatively narrow-width area that extends from the left end of the front bumper toward the left front side. A detection area CFR1 of the right front side sonar sensor 43FR1 is a relatively narrow-width area that extends from the right end of the front bumper toward the right front side. The left front sonar sensor 43FL2 is provided between the left end portion of the front bumper and the central portion thereof in the vehicle width direction, and the right front sonar sensor 43FR2 is provided between the right end portion of the front bumper and the central portion thereof in the vehicle width direction. A detection area CFL2 of the left front sonar sensor 43FL2 is a relatively narrow-width area that extends from between the left end portion of the front bumper and the central portion thereof toward the left front. A detection area CFR2 of the right front sonar sensor 43FR2 is a relatively narrow-width area that extends from between the right end portion of the front bumper and the central portion thereof toward the right front.

The left rear side sonar sensor 43RL1 is provided at the left end portion of the rear bumper, and the right rear side sonar sensor 43RR1 is provided at the right end portion of the rear bumper. A detection area CRL1 of the left rear side sonar sensor 43RL1 is a relatively narrow-width area that extends from the left end of the rear bumper toward the left rear side. A detection area CRR1 of the right rear side sonar sensor 43RR1 is a relatively narrow-width area that extends from the right end of the rear bumper toward the right rear side. The left rear sonar sensor 43RL2 is provided between the left end portion of the rear bumper and the central portion thereof in the vehicle width direction, and the right rear sonar sensor 43RR2 is provided between the right end portion of the rear bumper and the central portion thereof in the vehicle width direction. A detection area CRL2 of the left rear sonar sensor 43RL2 is a relatively narrow-width area that extends from between the left end portion of the rear bumper and the central portion thereof toward the left rear side. A detection area CRR2 of the right rear sonar sensor 43RR2 is a relatively narrow-width area that extends from between the right end portion of the rear bumper and the central portion thereof toward the right rear side.

Returning to FIG. 1, the HMI 60 is an interface for performing input/output of information between the ECU 10 and the driver, and includes an input device and an output device. Examples of the input device include a touch panel, a switch, and a voice pickup microphone. Examples of the output device include a display device 61, a speaker 62, and a buzzer 63. The display device 61 is, for example, a center display, a multi-information display, a head-up display, or a display of a navigation system installed in an instrument panel or the like. The speaker 62 is, for example, a speaker of an acoustic system or a navigation system.

Software Configuration

Figure 3:
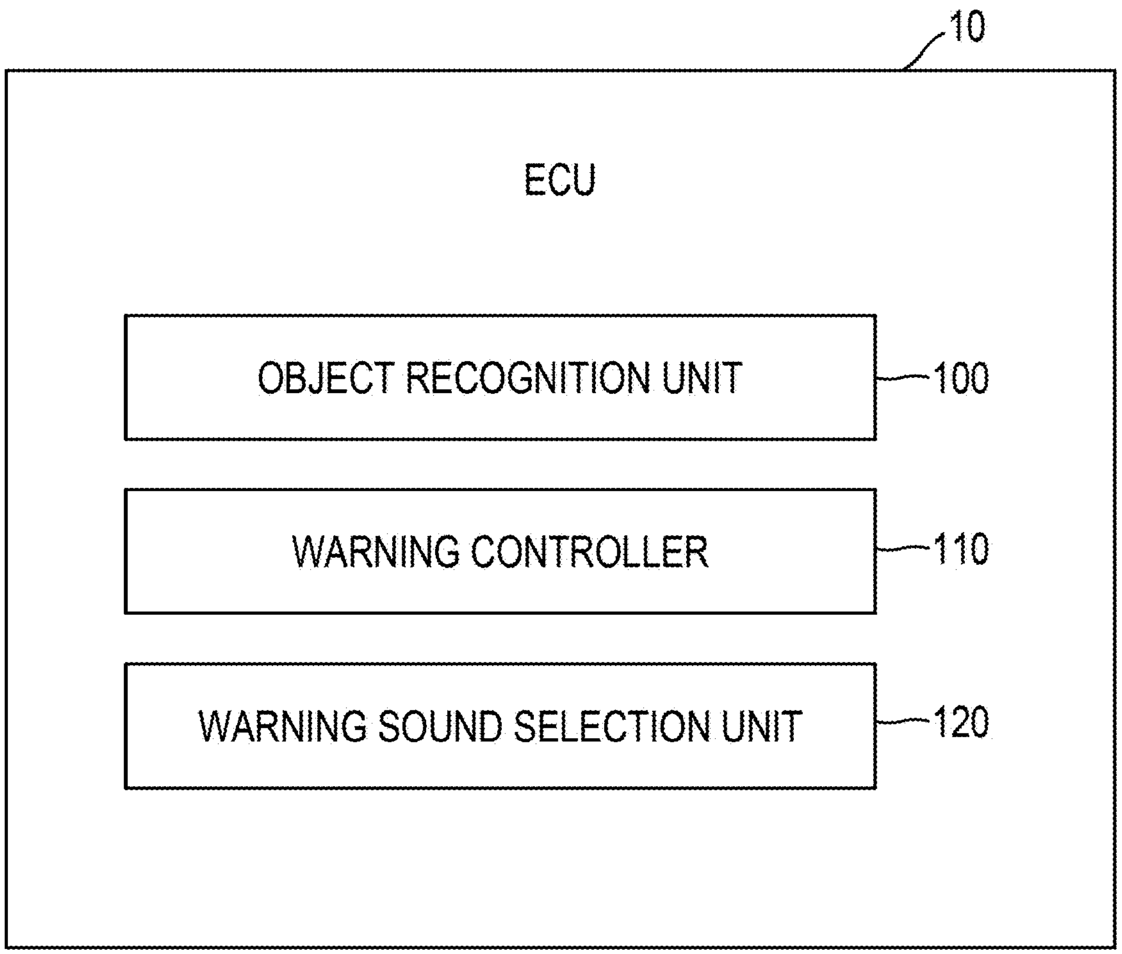
FIG. 3 is a schematic diagram illustrating a software configuration of the control device according to the present embodiment.

FIG. 3 is a schematic diagram illustrating a software configuration of the ECU 10 according to the present embodiment. As illustrated in FIG. 3, the ECU 10 includes an object recognition unit 100, a warning controller 110, a warning sound selection unit 120, and the like as functional elements. The functional elements 100, 110, 120 are realized when the CPU 11 of the ECU 10 reads the program stored in the ROM 12 to the RAM 13 and executes the program. All of or at least one of the functional elements 100, 110, 120 may be provided in another ECU separate from the ECU 10, or an information processing device of a facility (management center or the like) that can communicate with the vehicle VH.

The object recognition unit 100 recognizes a peripheral object, such as a stationary object existing in the periphery of the host vehicle VH, and an approaching object, such as another vehicle or a pedestrian approaching the host vehicle VH, based on the detection result of the external sensor device 40. The object recognition unit 100 recognizes a distance between the host vehicle VH and the peripheral object existing in the periphery of the host vehicle VH and a direction of the peripheral object with respect to the host vehicle VH based on the detection result of the sonar sensor 43 while the host vehicle VH is traveling at a predetermined low speed. The object recognition unit 100 recognizes a distance between the host vehicle VH and the approaching object that is approaching the host vehicle VH and a direction of the approaching object with respect to the host vehicle VH based on the detection result of the radar sensor 42 and/or the camera 41 while the host vehicle VH is traveling at a predetermined low speed. The object recognition unit 100 transmits the recognition result (distance, direction, and the like) of the peripheral object or the approaching object to the warning controller 110.

The warning controller 110 executes warning processing of giving the driver an alarm about a fact that the peripheral object or the approaching object is getting closer to the host vehicle VH based on the distance between the host vehicle VH and the peripheral object and the distance between the host vehicle VH and the approaching object, which are recognized by the object recognition unit 100. In the present embodiment, the warning controller 110 executes the warning processing in two stages of an "alert warning" and a "brake operation request warning". The alert warning is an example of "first alarm processing" of the present disclosure, and the brake operation request warning is an example of "second alarm processing" of the present disclosure. The brake operation request warning is a warning having a higher risk level than the alert warning.

In a case where a first warning condition is satisfied that at least one of the distance between the host vehicle VH and the peripheral object and the distance between the host vehicle VH and the approaching object is equal to or smaller than a predetermined first threshold value D1, the warning controller 110 executes the alert warning by causing the speaker 62 or the buzzer 63 to emit a first warning sound. The first warning condition is an example of a "first alarm condition" of the present disclosure. The first warning sound is emitted as a standardized warning sound having common characteristics (for example, frequency) regardless of a difference in the peripheral objects or the approaching objects (difference in the sensors that have performed the detections) or a difference in the directions (for example, front, rear, right, and left) of the detected objects with respect to the host vehicle VH. The common characteristic referred to herein is an example of a "first characteristic" of the present disclosure.

In a case where a second warning condition is satisfied that at least one of the distance between the host vehicle VH and the peripheral object and the distance between the host vehicle VH and the approaching object is equal to or smaller than a predetermined second threshold value D2 smaller than the first threshold value D1, the warning controller 110 executes the brake operation request warning by causing the speaker 62 or the buzzer 63 to emit a second warning sound. The second warning condition is an example of a "second alarm condition" of the present disclosure. The second warning sound is also emitted as a standardized warning sound having common characteristics (for example, frequency) regardless of a difference in the peripheral objects or the approaching objects, or a difference in the directions (for example, front, rear, right, and left) of the detected objects with respect to the host vehicle VH, as in the first warning sound.

The first warning sound and the second warning sound need to make the driver aware of the difference in the risk level. Therefore, the first warning sound and the second warning sound are emitted as warning sounds having different characteristics from each other. The different characteristic referred to herein is an example of a "second characteristic" of the present disclosure. In the present embodiment, the first warning sound is emitted from the speaker 62 or the buzzer 63 as an intermittent sound, and the second warning sound is emitted from the speaker 62 or the buzzer 63 as a continuous sound.

By the way, in a case where the object recognition unit 100 recognizes multiple peripheral objects or approaching objects and the warning controller 110 executes the warning processing for all of the peripheral objects or the approaching objects as the warning targets, the driver may be confused by multiple warning sounds being emitted at the same time. Therefore, for example, in a case where a first object and a second object exist as the warning targets in the same direction with respect to the host vehicle VH and the second object exists farther than the first object, it is desirable to execute the warning processing for the first object that is closer to the host vehicle VH and not to execute the warning processing for the second object existing farther than the first object. However, in a case where the risk level of the second object is increased to be higher than the risk level of the first object with the movement of the second object, an alarm about the risk of the second object needs to be reliably given to the driver.

In order to solve these problems, in a case where multiple warning targets are detected, the warning sound selection unit 120 determines priorities based on the directions of the warning targets with respect to the host vehicle VH and the risk levels of the warning targets, and appropriately selects a warning sound to be emitted in accordance with the determined priorities. Hereinafter, specific processing of selecting a warning sound will be described with reference to FIGS. 4A, 4B, 4C, and 4D.

Figure 4A:
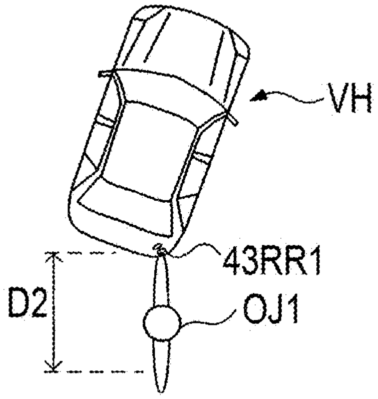
FIG. 4A is a schematic overhead view illustrating processing of selecting a warning sound by the control device according to the present embodiment.

A state will be assumed in which transition from a non-warning state where neither the first warning condition nor the second warning condition is satisfied is made when the object recognition unit 100 recognizes the first object approaching the host vehicle VH, then the warning controller 110 executes first warning processing for the first object as the warning target, and after that the warning controller 110 executes second warning processing (an example of a first alarm state of the present disclosure). Examples of such a state include, as illustrated in FIG. 4A, a case where the right rear side sonar sensor 43RR1 detects a stationary object OJ1 on the right rear side of the host vehicle VH while the host vehicle VH is moving backward out of a parking spot and a distance between the host vehicle VH and the stationary object OJ1 is equal to or smaller than the second threshold value D2.

In such a state, the object recognition unit 100 recognizes the second object different from the first object. When the object recognition unit 100 recognizes the second object, the warning sound selection unit 120 determines whether the second object satisfies the second warning condition. In a case where the second object does not satisfy the second warning condition, the warning sound selection unit 120 does not select the second object as the warning target even when the second object satisfies the first warning condition. That is, the warning controller 110 executes only the brake operation request warning for the first object as the warning target. Examples of such a state include, as illustrated in FIG. 4B, a case where the rear camera 41R or the right rear side radar sensor 42RR detects an approaching object OJ2 (for example, a pedestrian) at a distance within the first threshold value D1 from the host vehicle VH, but the approaching object OJ2 is in the same direction as the stationary object OJ1 with respect to the host vehicle VH, and the approaching object OJ2 is separated from the host vehicle VH by a distance larger than the second threshold value D2.

Even in a case where the second object recognized by the object recognition unit 100 satisfies the second warning condition, when the second object exists in the same direction as the first object with respect to the host vehicle VH and the risk level of the second object is lower than the risk level of the first object, the warning sound selection unit 120 does not select the second object as the warning target. That is, the warning controller 110 executes only the brake operation request warning for the first object as the warning target. Examples of such a state include, as illustrated in FIG. 4C, a case where the approaching object OJ2 (for example, the pedestrian) detected by the rear camera 41R or the right rear side radar sensor 42RR exists at a distance within the second threshold value D2, but the approaching object OJ2 exists in the same direction as the stationary object OJ1 with respect to the host vehicle VH and exists farther than the stationary object OJ1. As described above, even in a case where the second object satisfies the second warning condition, when there is no need to give the driver an alarm about the existence of the second object, the brake operation request warning for the second object as the warning target is not executed, so that confusion of the driver can be effectively prevented.

Figure 4B:
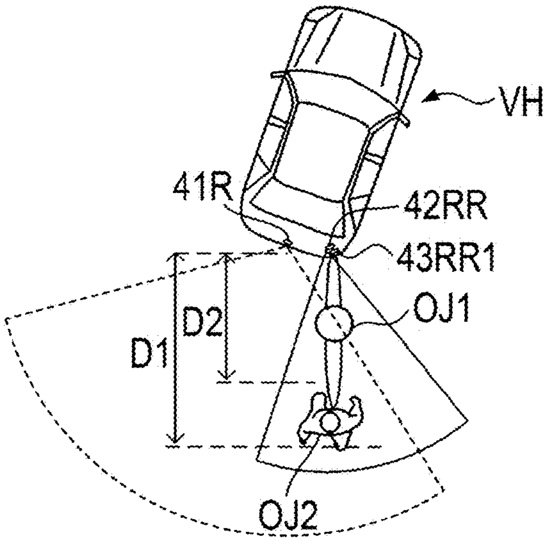
FIG. 4B is a schematic overhead view illustrating processing of selecting a warning sound by the control device according to the present embodiment.
Figure 4C:
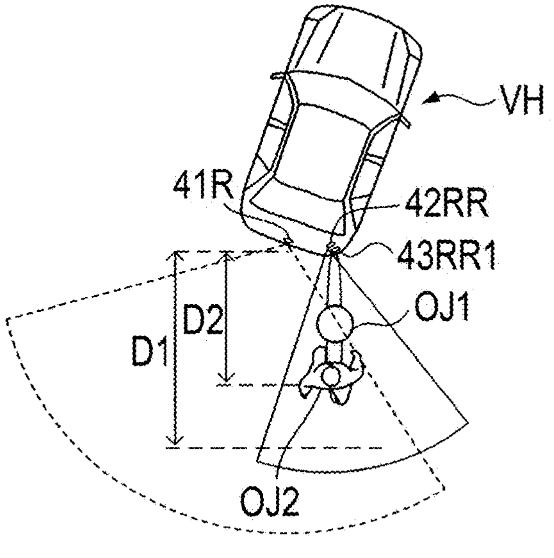
FIG. 4C is a schematic overhead view illustrating processing of selecting a warning sound by the control device according to the present embodiment.

In the present disclosure, "the first object and the second object exist in the same direction" is a concept including, as illustrated in FIGS. 4B and 4C, a case where the first object and the second object exist on substantially the same straight line, as well as a case where the first object and the second object exist in the same area when the periphery of the host vehicle VH is divided into multiple areas. The number of the divided areas may be, for example, eight (front, front right, front left, right, left, rear right, rear, rear left), four (front, rear, right, left), or two (front and rear or right and left). The number of areas may be appropriately set in accordance with the number of sensors provided in the external sensor device 40 or the like.

Figure 4D:
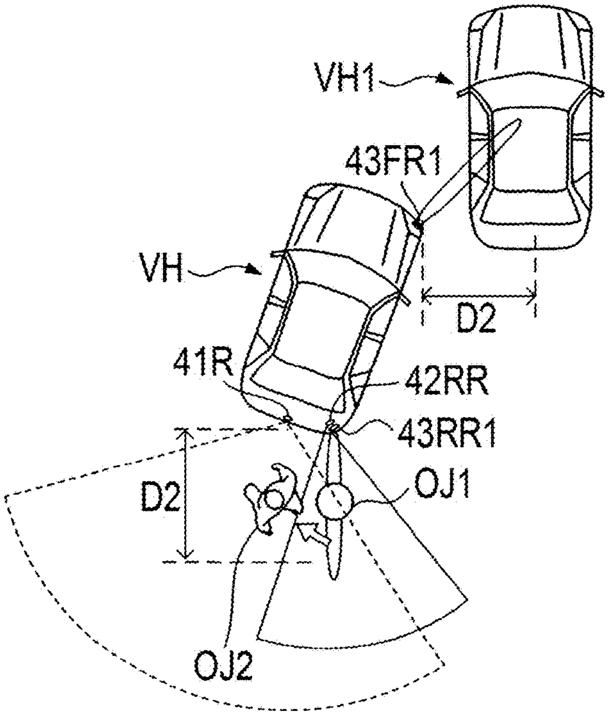
FIG. 4D is a schematic overhead view illustrating processing of selecting a warning sound by the control device according to the present embodiment.

On the other hand, the warning sound selection unit 120 selects third warning processing in a case where the second object recognized by the object recognition unit 100 moves in a direction different from the direction of the first object with respect to the host vehicle VH and the risk level of the second object is increased to be higher than the risk level of the first object, or in a case where a new stationary object or approaching object recognized by the object recognition unit 100 satisfies the second warning condition as the second object. When the warning sound selection unit 120 selects the third warning processing, the warning controller 110 executes the brake operation request warning by causing the speaker 62 or the buzzer 63 to emit a third warning sound. Examples of such a state include, as illustrated in FIG. 4D, a case where the approaching object OJ2 (for example, the pedestrian) detected by the rear camera 41R or the right rear side radar sensor 42RR moves in a direction different from the direction of the stationary object OJ1 with respect to the host vehicle VH and the approaching object OJ2 satisfies the second warning condition, and a case where the right front side sonar sensor 43FR1 detects an adjacent vehicle VH1 as a new stationary object within the second threshold value D2 and the adjacent vehicle VH1 satisfies the second warning condition.

The third warning sound needs to make the driver aware that the third warning sound is the brake operation request for the warning target different from the warning target of the second warning sound. Therefore, the third warning sound is emitted as a warning sound having the same characteristic as the second warning sound and having a different characteristic from the second warning sound. The same characteristic as used herein is an example of a "second characteristic" of the present disclosure, and the different characteristic is an example of a "third characteristic" of the present disclosure. In the present embodiment, the third warning sound is a continuous sound that is the same as the second warning sound, and is emitted from the speaker 62 or the buzzer 63 at a different frequency or in a different tone color.

As described above, in a case where the second object exists in a direction different from the direction of the first object with respect to the host vehicle VH and the risk level of the second object is higher than the risk level of the first object, it is possible to reliably give the driver an alarm about the existence of the second object having a higher risk level by emitting the third warning sound for the second object as the warning target. The third warning sound may be emitted in superimposition with the second warning sound, or the second warning sound may be stopped and only the third warning sound may be emitted. The third warning sound may be emitted for a certain time such that the third warning sound is not a momentary sound when the third warning sound is emitted once, and then emission of the second warning sound may be resumed.

Figure 5:
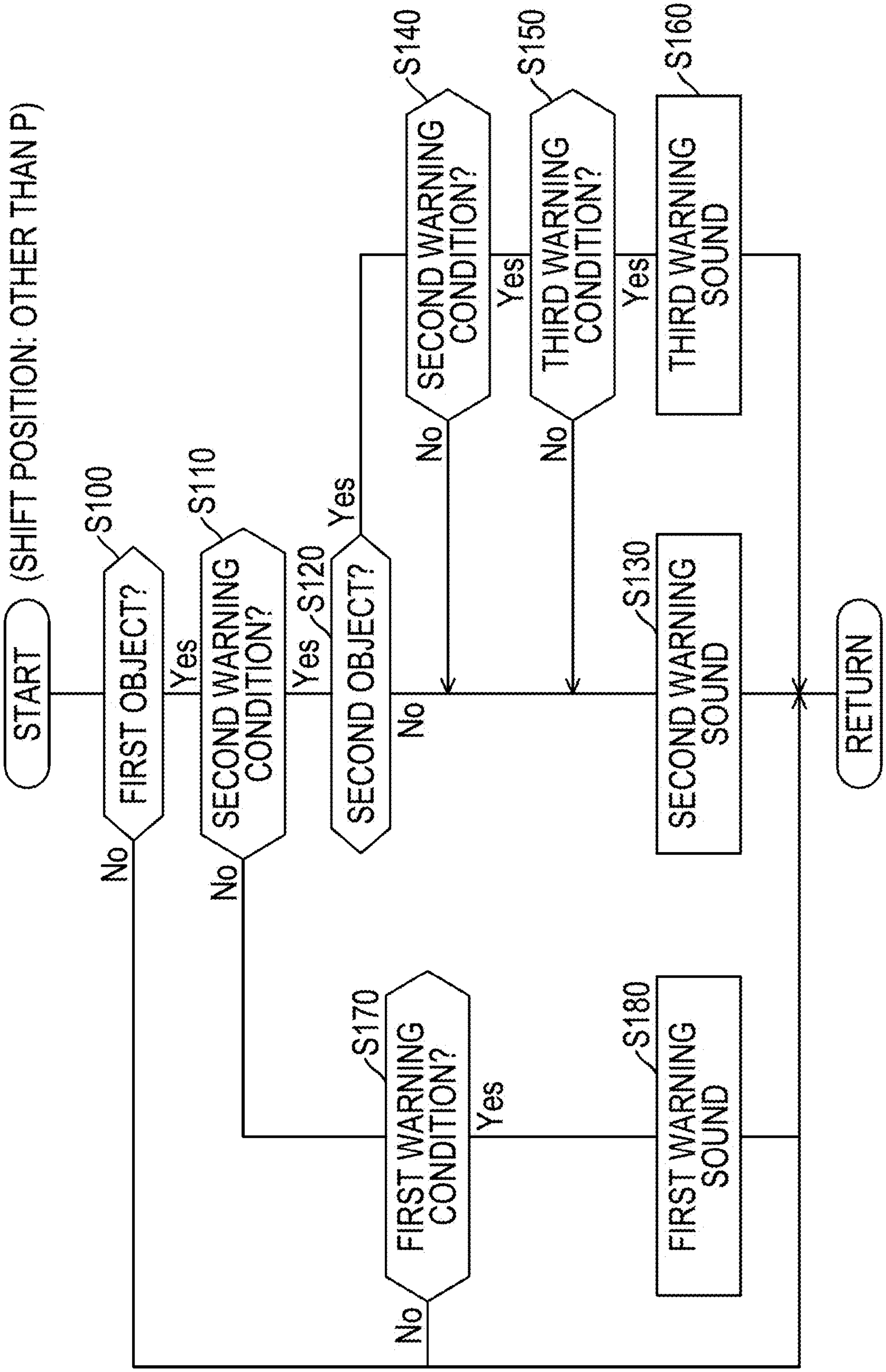
FIG. 5 is a flowchart illustrating a flow of warning processing by the control device according to the present embodiment.

Next, a flow of the warning processing by the CPU 11 of the ECU 10 will be described with reference to FIG. 5. The present routine is started, for example, when the shift sensor 35 detects a shift position other than the parking P.

In step S100, the ECU 10 determines whether a first object as a warning target exists based on the detection result of the external sensor device 40. In a case where the first object exists (Yes), the ECU 10 proceeds to the process of step S110. On the other hand, in a case where the first object does not exist (No), the ECU 10 returns the present routine.

In step S110, the ECU 10 determines whether the first object satisfies the second warning condition, that is, whether the brake operation request warning for the first object as the warning target is needed. In a case where the first object does not satisfy the second warning condition (No), the ECU 10 proceeds to the process of step S170. On the other hand, in a case where the first object satisfies the second warning condition (Yes), the ECU 10 proceeds to the process of step S120.

In step S170, the ECU 10 determines whether the first object satisfies the first warning condition, that is, whether the alert warning for the first object as the warning target is needed. In a case where the first object satisfies the first warning condition (Yes), the ECU 10 proceeds to the process of step S180 to cause the speaker 62 or the buzzer 63 to emit the first warning sound (intermittent sound), and then returns the present routine. On the other hand, in a case where the first object does not satisfy the first warning condition (No), the ECU 10 returns the present routine.

In step S120, the ECU 10 determines whether a second object as a warning target exists based on the detection result of the external sensor device 40. In a case where the second object exists (Yes), the ECU 10 proceeds to the process of step S140. On the other hand, in a case where the second object does not exist (No), the ECU 10 proceeds to the process of step S130 to cause the speaker 62 or the buzzer 63 to emit the second warning sound (continuous sound), and then returns the present routine.

In step S140, the ECU 10 determines whether the second object satisfies the second warning condition, that is, whether the brake operation request warning for the second object as the warning target is needed. In a case where the second object does not satisfy the second warning condition (No), the ECU 10 proceeds to the process of step S130 to cause the speaker 62 or the buzzer 63 to emit the second warning sound (continuous sound), and then returns the present routine. On the other hand, in a case where the second object satisfies the second warning condition (Yes), the ECU 10 proceeds to the process of step S150.

In step S150, the ECU 10 determines whether an execution condition of the third warning processing is satisfied that the second object exists in a direction different from the direction of the first object with respect to the host vehicle VH and has a higher risk level than the first object. In a case where the execution condition of the third warning processing is not satisfied (No), the ECU 10 proceeds to the process of step S130 to cause the speaker 62 or the buzzer 63 to emit the second warning sound (continuous sound), and then returns the present routine. On the other hand, in a case where the execution condition of the third warning processing is satisfied (Yes), the ECU 10 proceeds to the process of step S160 to cause the speaker 62 or the buzzer 63 to emit the third warning sound (that is a continuous sound and has a frequency or tone color different from the second warning sound), and then returns the present routine.

Although the alarm device and the alarm method according to the present embodiment have been described above, the present disclosure is not limited to the above-described embodiment, and various modifications may be made as long as the modifications do not deviate from the scope of the present disclosure.

For example, in the above-described embodiment, the warning controller 110 has been described as a controller configured to execute the first warning processing and the second warning processing stepwise for a stationary object detected by the sonar sensor 43 and an approaching object detected by the radar sensor 42 or the camera 41, but may be configured to execute the stepwise warning processing for only one of the stationary object and the approaching object and execute only one of the first warning processing and the second warning processing for the other one of the stationary object and the approaching object. The third warning sound has been described as a sound having the characteristic (continuous sound) common to the second warning sound, but the third warning sound may be temporarily emitted as a warning sound having no characteristic common to the second warning sound.

What is claimed is:

1. An alarm device comprising a processor configured to:

determine whether a first target is detected by sensors mounted on a host vehicle;

determine whether the first target satisfies a first condition in response to determining that the first target is detected, the first condition being that a distance between the host vehicle and the first target is less than a first threshold value;

determine whether a second target is detected by the sensors in a state where the first target is detected;

determine whether the second target satisfies the first condition in response to determining that the second target is detected;

control a speaker or a buzzer of the host vehicle to emit a first alarm sound in a case where a determination is made that the first target satisfies the first condition and the second target does not satisfy the first condition, the first alarm sound being a continuous sound having a first frequency;

determine whether the second target satisfies a second condition in a case where a determination is made that both the first target and the second target satisfy the first condition, the second condition being that (i) the second target is located, with respect to the host vehicle, in a direction different from the first target, and (ii) a risk level is higher for the second target than for the first target; and control the speaker or the buzzer of the host vehicle to emit a second alarm sound in a case where a determination is made that the second target satisfies the second condition, the second alarm sound being a continuous sound having a second frequency different from the first frequency.

2. The alarm device according to claim 1, wherein the processor is further configured to:

determine whether the first target satisfies a third condition in a case where a determination is made that the first target does not satisfy the first condition, the third condition being a distance between the host vehicle and the first target is equal to or less than a second threshold value, the second threshold value being greater than the first threshold value; and control the speaker or the buzzer of the host vehicle to emit a third alarm sound in a case where the first target satisfies the third condition, the third alarm sound being an intermittent sound having the first frequency.

3. The alarm device according to claim 2, wherein the third alarm sound corresponds to an alert that alerts an occupant in the host vehicle, and the first alarm sound and the second alarm sound correspond to a brake operation request that urges the occupant to perform a brake operation.

4. The alarm device according to claim 1, wherein the processor is further configured to control the speaker or the buzzer of the host vehicle to emit the first alarm sound in a case where a determination is made that the second target does not satisfy the second condition.

5. The alarm device according to claim 1, wherein the risk level increases as a distance between the host vehicle and the first target or the second target decreases.

6. The alarm device according to claim 1, wherein the processor is configured to communicate with the sensors mounted on the host vehicle, the sensors including a front camera, a rear camera, a left front side radar sensor, a central front side radar sensor, a right front side radar sensor, a left rear side radar sensor, a central rear side radar sensor, a right rear side radar sensor, a left front side sonar sensor, a right front side sonar sensor, a left rear side sonar sensor, and a right rear side sonar sensor.

7. The alarm device according to claim 6, wherein the processor is further configured to:

acquire data corresponding to multiple regions around the host vehicle from the sensors, the multiple regions being obtained by dividing an area surrounding the host vehicle into a plurality of areas; and determine in which of the multiple regions the first target and the second target are respectively located based on the acquired data, and the determination of whether the second target satisfies the second condition includes determining whether the first target and the second target exist in the same region.

8. The alarm device according to claim 7, wherein a condition is satisfied that the second target is located, with respect to the host vehicle, in the direction different from the first target, in a case where the first target and the second target do not exist in the same region.

* * * * *